United States Patent [19]

Peschel

[11] 4,423,499

[45] Dec. 27, 1983

[54] PICKUP ADJUSTING EQUIPMENT

[75] Inventor: Karl Peschel, Vienna, Austria

[73] Assignee: AKG Akustische u.Kino-Geräte Gesellschaft m.b.H., Austria

[21] Appl. No.: 291,121

[22] Filed: Aug. 7, 1981

[30] Foreign Application Priority Data

Nov. 8, 1980 [AT] Austria ................................ 4118/80

[51] Int. Cl.³ ............................................ G11B 3/10
[52] U.S. Cl. ................................................. 369/55
[58] Field of Search ......................................... 369/55

[56] References Cited

U.S. PATENT DOCUMENTS 3,283,411 11/1966 Steward ................................ 369/55
3,686,939 8/1972 Fuehs et al. ......................... 369/55
4,295,277 10/1981 Dennesen et al. .................... 369/55
4,326,283 4/1982 Tonlan et al. ........................ 369/55
4,351,045 9/1982 Townshend ......................... 369/55
4,368,527 1/1983 Goldstein ............................ 369/55

FOREIGN PATENT DOCUMENTS 1083558 6/1960 Fed. Rep. of Germany ........ 369/55
2054239 2/1981 United Kingdom ................. 369/55

Primary Examiner—Steven L. Stephan
Attorney, Agent, or Firm—McGlew and Tuttle

[57] ABSTRACT

A auxiliary device for adjusting a pickup and pickup arm of a record player is disclosed. The adjusting device has an L-shaped cross section and orienting gratings on the legs thereof for aligning the pickup and pickup arm when the stylus of the pickup is received on a contact point provided on the device.

14 Claims, 5 Drawing Figures

PICKUP ADJUSTING EQUIPMENT

FIELD AND BACKGROUND OF THE INVENTION

The invention relates in general, to phonograph pickups and pickup arms and more particularly to an auxiliary device for precision adjusting phonograph pickups and pickup arms, wherein the auxiliary device is designed for placement on the turntable.

The correct mounting and adjustment of the pickup and pickup arm has fundamental importance for optimizing the function of today's high quality pickups, and for as sparing a tracking of record as possible. Upon the purchase of a new phonograph, for example, the purchaser himself, may wish to mount and adjust the pickup, even though he frequently is not skilled in this regard and does not have the proper means for adjustment. The problem is complicated by the fact that certain necessary adjustments affect others and must, therefore, alternately be repeated.

Basically, the following adjusting operations must be executed most exactly:

1. Adjustment of the overhang (the distance by which the pickup stylus overhangs the turntable spindle when a conventional arm is moved to the center of a record)

The overhang is adjusted in order to optimize the error angle during movement of the pickup arm across the record. An error angle results from the fact that the grinding axis of the stylus exactly coincides with the groove tangent only at two points of the record surface. In practice, this means that if the pickup arm is moved up to record center, the stylus is not aligned with the record center but projects or "overhangs" slightly beyond. The distance between the record center and the stylus depends among others on the shape and length of the pickup arm. Any incorrectly adjusted overhang increases distortions resulting from the error angle which can never be eliminated with conventional pickup arms. To check the correct overhang which is adjusted by shifting the pickup arm in its support, templates are employed indicating the position of the pickup at a predetermined angle of the arm.

2. Adjustment of the normal (perpendicular) position of the stylus relative to the record surface as viewed in the groove direction This adjustment is frequently neglected. In fact however, this position affects the cross-talk attentuation between the two sound channels of the stereo record and, particularly, the wear of the record if a specially ground stylus is used. It is a common practice to check this normal position by placing a flat mirror on the turntable and observing whether the edges of the pickup housing align with their mirror images. If not, the sound head support must be turned in the pickup arm. Difficulties arise with this method in instances where due to its shape, the pickup cannot show a clear mirror image alignment, or if the thickness of the mirror does not exactly correspond to that of the record.

3. Adjustment of the pickup arm tube in horizontal position

Some pickup arms have a vertically adjustable fulcrum. This makes allowance for different heights of the pickup. Since the superelevation between the arm fulcrum and the stylus point affects the track angle, an exactly horizontal position of the arm is needed to eliminate distortions. Up to the present time, this has been done merely by optically checking the constant spacing between the pickup arm tube and the record surface.

4. Checking the vertical tracking angle

While cutting a record, the cutting stylus is inclined by 15° to 20° against the running direction of the cut matrix. To minimize distortions or intermodulation during the production of the record, the pickup stylus also is held in this angular position. Since the commercially available pickups may vary in size, the actual vertical track angle should also be checked, in addition to the checking of the horizontal position mentioned under 3 above, which however, cannot be done by the user without employing special instruments.

5. Adjustment of the downward pressure or stylus force

It is absolutely necessary to keep to the downward pressure in the range indicated by the pickup manufacturer in order to avoid distortions and record damages. Frequently, however, a sufficiently accurate scale is not provided on the pickup arm. Therefore, the checking can be done only with a special pickup arm balance.

Thus, it is clear that many of the necessary adjustments are only very inaccurately completed by technically unskilled persons, or that a number of additional adjusting and checking devices are needed.

SUMMARY OF THE INVENTION

The invention is directed to a simple device which is easy to manufacture and handle and which unites all the checking functions necessary for mounting and mutually adjusting the pickup and the pickup arm in the most proper way.

This is achieved, in accordance with the invention, by providing an auxiliary device comprising two plane-surface parts, preferably separable from each other, which are assembled to form legs of an L-shape and which are provided with orienting elements in the form of line gratings or measuring devices with scales, or both, with respective definite contact points for the stylus being provided on the longer L leg of the L-shaped device.

The invention has the advantage that all the auxiliary means needed for an adjustment are united into a single piece of equipment, so that a simplification is obtained and errors are eliminated which might occur due to the use of individual adjusting elements. Also, no misplacement or loss of one or the other part is possible. Further, the handling of the inventive auxiliary device is simple and logical thereby making it possible even for an unskilled person to optimally adjust a pickup and the supporting arm thereof. Nevertheless, the invention may advantageously be applied in industrial applications and contributes to a cost reduction in the assembly of record players.

The essential part of the auxiliary device is the orienting elements which are provided as line gratings and sighting means on the two legs. Upon placing the auxiliary device in the proper manner, on the turntable, the direction of inclination of the pickup or pickup arm can clearly be seen and corrected, if necessary, with the prerequisite, of course, that the stylus is brought to rest against the proper contact point of the device provided for the respective adjustment.

The inventive auxiliary device may also be employed as a balance for determining the downward pressure of the stylus. As compared to prior art devices of this kind, the inventive device is extremely simple and robust, without being inaccurate.

Thus, it is an object of the invention to provide a device for adjusting a pickup carrying a stylus and a pickup arm of a record player of the type adapted to be received on the turntable which includes a structure having a first plane surface part and a second plane surface part so connected to said first plane surface part to form an L-shaped structure, a contact point on the longer of the first and second plane surface parts for receiving the stylus, and orienting means on the structure for comparing the position of the pickup and pickup arm relative thereto when the stylus is received on the contact point.

It is a further object of the invention to provide a device for adjusting a pickup and pickup arm which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION

Figure 1:
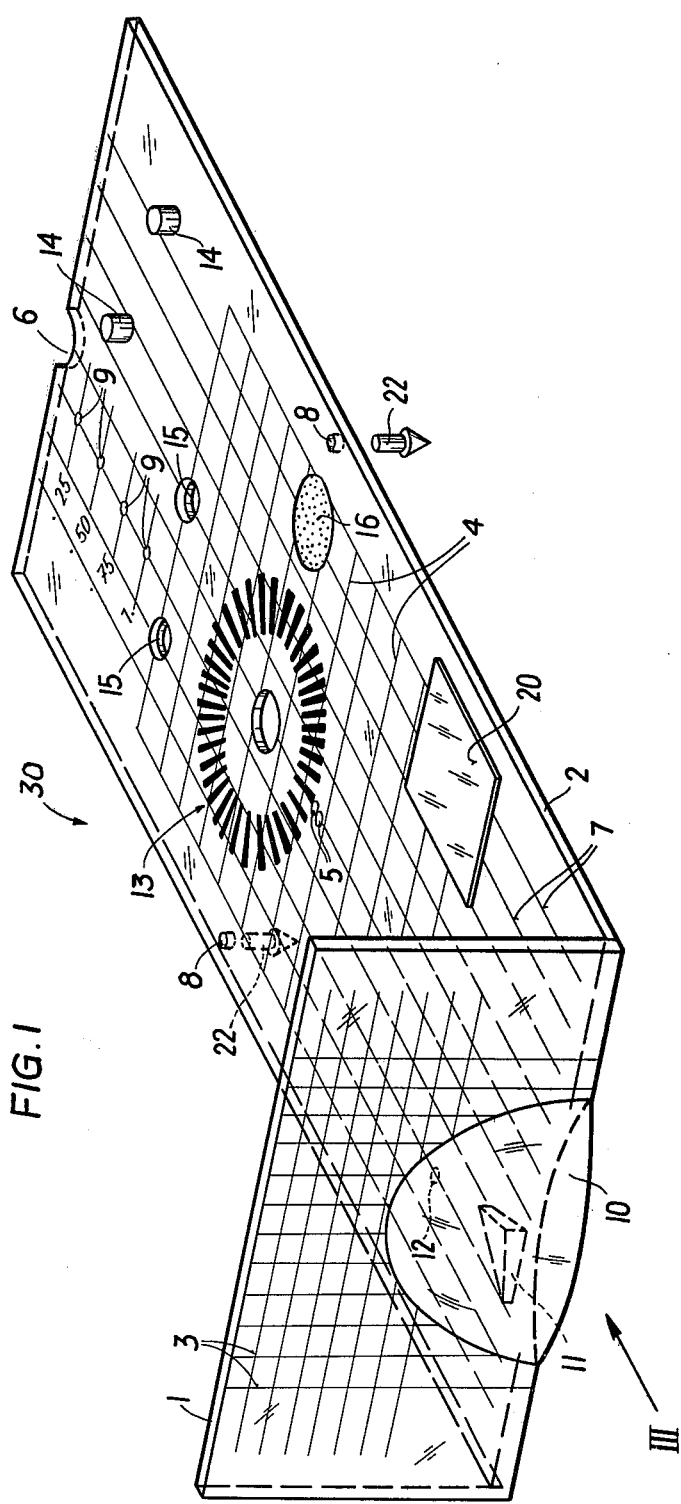
FIG. 1 is a diagrammatical perspective view of the inventive device.

As shown in FIG. 1, the inventive auxiliary device 30 substantially comprises two legs or plates 1, 2 which are assembled to form an L-shaped structure. In principle, the device might be in a single piece, however, separable plates 1, 2 are advantageous, for example, for space saving storage. Plate 2 must have exactly the same thickness as a phonograph record. At least plate 1, moreover, must be made of a transparent material. The Two parts 1 and 2 extend perpendicularly to each other and form an L in cross section.

Figure 3:
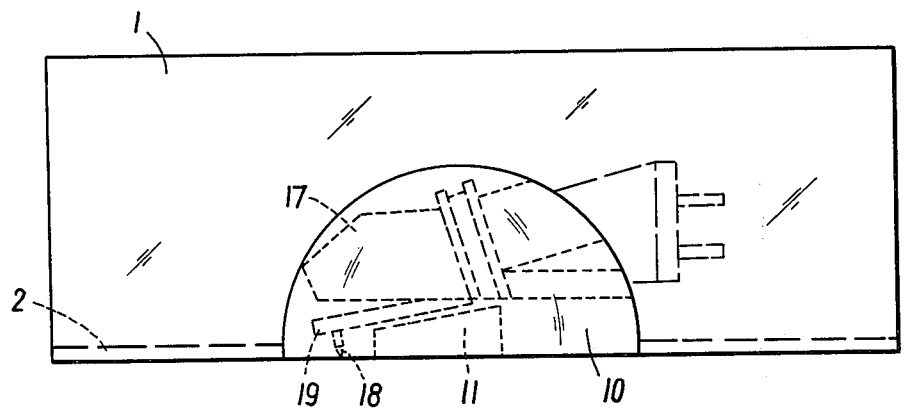
FIG. 3 is a front view of the shorter leg of the device.

For adjusting the overhang (adjustment member 1 above), a line grating 4 is provided which is associated with a contact point 5 for the stylus 18 of a pickup 17 (FIG. 3). The auxiliary device 30 is placed on the turntable in a position in which a recess 6 embraces the turntable spindle. The pickup, or the pickup arm in constructions with a displaceable arm, is displaced until the edges of the pickup or pickup arm are aligned with the line grating 4. A mirror 20 serves to bring the stylus into the correct vertical position. The mirror may be adhered to the device or produced in any other advantageous manner. In this way adjustment number 2 which was set forth above, can be made. With some pickup designs, a more accurate method consists in placing the auxiliary device on the turntable so that the leg 2 extends in the direction of the pickup arm and toward its fulcrum while leg 1 extends directly in front of the front edge of the pickup and parallel thereto, and using a line grating 3 of leg 1 as a sighting means. That is, the device 30 is placed with the right-hand edges of legs 1 and 2 as seen in FIG. 1, down on the turntable. By looking through leg 1, in the direction of the front side of the pickup, any angular misalignment of the pickup may easily be detected by means of line grating 3.

Lines 7 serve for checking the horizontal position (adjustment member 3 above) of the tonearm tube. For this purpose, the auxiliary device 30 is again turned through a ninety degree angle (about the long axis of leg 2) and placed upright on the turntable, so that lines 7 serve as a sighting means for the arm tube.

Leg 2 includes a wedge-shaped element 11 which forms the part of the device intended for checking the vertical tracking angle. The pickup axis and leg 1 are brought into a position in which they are parallel to each other and the stylus rests against contact point 12. As best shown in FIG. 3, with the pickup arm lowered, the position of stylus holder 19 can be checked by means of the incline of element 11 through a magnifying glass 10, which is built into leg 1. If the inclinations correspond to each other, the correct tracking angle may be inferred therefrom indirectly, since stylus 18 (FIG. 3) is mostly secured to stylus holder 19 in perpendicular position. It is also possible to select an angle of incline 11 corresponding to another specific edge of the housing, having a definite geometric relation to the stylus direction. In this way adjustment number 4 above can be made.

Figure 2A:
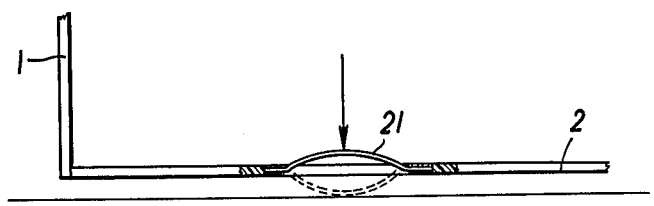
FIGS. 2a, 2b and 2c show different embodiments of a detail of the device for balancing.

A graduation 9 makes it possible to determine the stylus force of downward pressure of the stylus by means of the inventive auxiliary device 30, while using leg 2 as a balance beam. The fulcrum permitting such a motion of leg 2 may be formed by a leaf spring 21 secured to each longitudinal side of leg 2 and simply buckled downwardly as soon as the balancing function is needed. (FIG. 2a)

Figure 2B:
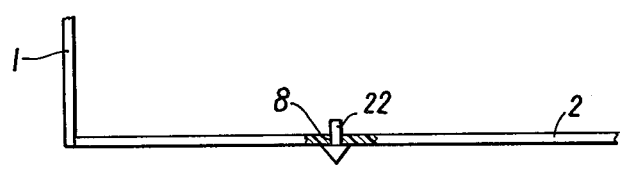
Figure 2C:

It is also possible, however, to insert additional contact elements 22 into recesses 8 provided for this purpose on the longer part (see FIG. 2b). According to another embodiment as shown in FIG. 2c, the longer leg 2 may be provided with laterally separated triangular notches 24 which are engageable with knife-edge supports 23 provided on the shorter leg 1. For this purpose, of course, the two legs 1,2 must be detachable from each other. As to the determination of the downward pressure, it should further be understood that the center of gravity of a balance is situated below the fulcrum, to obtain a static equilibrium. This prerequisite is not satisfied in the variants of FIG. 2a and 2b. In these instances, it is advisable to displace the stylus resting against graduation 9 until leg 2 tilts from one inclined position into the other.

The inventive auxiliary equipment may even be provided in addition with further means, such as with two retaining pins 14 fitting in the mounting holes of the pickup arm and usable for fixing the arm, to facilitate the engagement of the contact shoes. Holes 15 of corresponding diameter for receiving the heads of cylindrical screws needed for mounting the pickup serve the purpose of fixing the heads while having both hands free for the assemblage.

Further, a plastic mass for cleaning the stylus may be received in a corresponding recess 16. That is, experience has shown that it is advantageous to clean strongly fouled styluses by pressing them lightly into a permanently elastic material whereby even dirt firmly adhering to the stylus is securely removed.

It is also simple to provide the equipment with a stroboscope 13 or stroboscopic marks for checking the speed of the record. The marks may be printed or formed by molding, preferably on the underside of part 2.

Elements for some of the mentioned functions may be omitted. For example, if the inventive device 30 is designed to check pickups only, checking for the overhang makes no sense, since the overhang depends on the design of the pickup arm. It may also be provided to design the measuring equipment as a part of a pickup packaging, for example, with leg 1 forming the bottom and leg 2 a side wall of a rectangular box.

Thus, in accordance with the invention, there is provided an auxiliary device for adjusting the pickup and pickup arm of a record player as exactly as possible, which is designed to be placed on the turntable, characterized in that the equipment comprises two plane-surface parts 1,2 preferably separable from each other, which are assembled to form an L-shaped structure and which are provided with at least orienting elements in the form of line gratings 3,4,7 or measuring devices 11, or both, and graduations 9, with respective definite contact points 5,9,12 for the stylus 18 being provided on the longer leg 2 of the L-shaped auxiliary device. In accordance with an embodiment of the invention, the device is characterized by the feature that one of the orienting elements comprises a grating of crossing parallel lines 7 which are associated with a contact point 5 for the stylus and that this arrangement is provided on the longer leg 2 having a recess 6 for engaging over or resting against the pivot pin of the turntable.

In accordance with a further embodiment, the invention is characterized by the feature that the measuring device is designed as a balancing device with a graduation 9 indicating the downward pressure of the stylus 18. The balance beam of the balancing device is peferably formed by the longer leg 2 of the L-shaped auxiliary equipment, which may be provided with insertable contact elements 22 or with a leaf spring 21 mounted for buckling downwardly. The longer leg 2, serving as the balance beam, is provided on each of two opposite locations of its longitudinal sides with a triangular notch 24 into which two knife-edges 23 provided on the shorter leg 1 are engageable. In the vicinity of the shorter leg 1, the larger leg 2 is provided with a preferably wedge-shaped element 11 located at least approximately near the focal point of a magnifying glass 10 which is mounted in the shorter leg 1, and that this arrangement is associated with a definite contact point 12 for the stylus 18, provided on the longer leg 2.

The device is preferably even still further characterized by the feature that one of the orienting elements comprises a number of parallel lines 7 extending on the longer leg 2 parallel to the longitidunal axis thereof.

The shorter leg 1 is preferably made of a transparent material and is provided with a line grating 3 of perpendicularly crossing lines which extend parallel to the sides of the rectangle formed by the shorter leg 1.

The longer leg 2 is preferably provided with a mirror 20 and the mirror is formed by vapor deposition on the surface of the longer leg 2.

The equipment is preferably designed as a part of a pickup packing.

While specific embodiments of the invention have been shown and described in detail to illustrate the application of the principles of the invention, it will be understood that the invention may be embodied otherwise without departing from such principles.

What is claimed is:

1. A device for adjusting a pickup carrying a stylus and a pickup arm of a record player, of the type adapted to be received on a turntable of the record player, which turntable includes a spindle, comprising:

a structure having a first plain surface part adapted to lie on the turntable and a second plain surface part so connected to said first plain surface part to form an L-shaped structure, with said second plain part adapted to extend up from the turntable;

a contact point on said first plain surface part for receiving the stylus, said first plain surface part being longer than said second plain surface part; and orienting means on said structure for comparing the position of the pickup and the pickup arm relative thereto when the stylus is received on contact point, said orienting means comprising parallel lines on said first and second plain surface parts with said second plain surface part being made of transparent material so that the stylus on the contact point can be viewed and aligned through said second plain surface part;

said longer first plain surface part having an edge opposite said second plain surface part with a recess at a center of said edge for engaging against the turntable spindle when the first plain surface part is on the turntable for adjusting the pickup.

2. A device as set forth in claim 1, wherein said longer first plain surface part comprises a balancing member for measuring stylus force, said first plain surface part having a gradation indicating the downward pressure of the stylus and fulcrum-forming means connected to said first plain surface part for forming a fulcrum which cooperates with said gradation to measure stylus force.

3. A device according to claim 2, wherein said fulcrum-forming means comprises at least one contact element insertable into an opening in said first plain surface part for forming said fulcrum.

4. A device as set forth in claim 2, wherein said fulcrum-forming means comprises a leaf spring mounted for downward buckling to said first plain surface part for forming said fulcrum.

5. A device as set forth in claim 2, wherein said fulcrum-forming means comprises a triangular notch defined on said first plain surface part adjacent each of two longitudinal sides of said first plain surface part and a knife edge defined on said second plain surface part for receiving each triangular notch to form said fulcrum, said first and second plain surface parts being separable from each other to form said fulcrum.

6. A device as set forth in claim 1, comprising a wedge-shaped element mounted on said first plain surface part adjacent said second plain surface part and a magnifying glass defined on said transparent second surface part for viewing a stylus on the contact point and for viewing said wedge-shaped element.

7. A device as set forth in claim 6, wherein said magnifying glass is integrally formed in a transparent material of said second plain surface part.

8. A device a set forth in claim 1, wherein said parallel lines on said longer first plain surface part extend parallel to a longitudinal axis of said plain surface part, said parallel lines on said shorter second plain surface part forming a grading of crossing parallel lines.

9. A device as set forth in claim 1, including a mirror mounted on said said longer first plain surface part.

10. A device as set forth in claim 9, wherein said mirror is formed by vapor-deposition on a surface of said first plain surface part.

11. A device as set forth in claim 1, including an opening through said first plain surface part for receiving a spindle of the turntable and a plurality of strobe markings evenly spaced around said opening.

12. A device as set forth in claim 11, wherein said first plain surface part includes a plastic mass embedded therein for cleaning a stylus.

13. A device according to claim 12, including a mirror extending over a portion of said first plain surface part.

14. A device as set forth in claim 13, including balance means connected to said longer part for establishing a fulcrum of rotation of said longer part to form said longer part into a balance beam and graduated markings on said longer part for indicating a force applied one of said graduations.

* * * * *

UNITED STATES PATENT AND TRADEMARK OFFICE
CERTIFICATE OF CORRECTION

PATENT NO. : 4,423,499
DATED : December 27, 1983
INVENTOR(S) : Karl Peschel

It is certified that error appears in the above-identified patent and that said Letters Patent is hereby corrected as shown below:

On the title page, Item [30]
"Nov. 8, 1980" should read -- Aug. 11, 1980 --.

Signed and Sealed this

Twenty-ninth Day of May 1984

[SEAL]

*Attest:*

GERALD J. MOSSINGHOFF

*Attesting Officer*  *Commissioner of Patents and Trademarks*